2,804,421

TETRACYCLINE TYPE ANTIBIOTIC OINTMENT

Frank Edwin Stirn and Jens Thuroe Carstensen, Pearl River, N. Y., assignors to American Cyanamid Company, New York, N. Y., a corporation of Maine No Drawing. Application April 24, 1951,
Serial No. 222,729

4 Claims. (Cl. 167—63)

This invention relates to an ointment containing a broad-spectrum tetracyaline type antibiotic in an anhydrous ointment base which readily forms with water a water-in-oil emulsion, which ointment may be applied to a bandage which is applied to a wound, may be applied directly to a wound or infection, or may be injected into cavities, for either curative or phophylactic purposes.

Most ointments are either of an oil base or an oil-in-water dispersion. Petrolatum, for example, has long been used on burns, on various types of wounds, etc. We have found that the use of an anhydrous base which forms water-in-oil emulsions provides a means for carrying a water-soluble broad-spectrum tetracyaline type antibiotic into the areas where it may be desired, and provides a storage depot which releases the antibiotic over a prolonged period. Furthermore, our particular ointment may be removed by rinsing or irrigation with water. Petrolatum-type ointments or oil-in-water emulsions cannot be so removed.

Our ointment may be applied to a bandage or dressing which is applied to the wound, or may be applied to the wound or area to be treated directly. For example, our ointment may be used by a dentist for injection into the sockets after the removal of teeth, or applied elsewhere as desired within the mouth either to modify the course of an infection, or as a phophylactic measure to prevent infection. Our ointment may be used as a topical ointment to be spread on the surface of the skin as for example, in the case of burns or after surgery, or to abrasions, rashes, various types of infections such as impetigo, etc. The ointment may be used for injection into a cow's udder for the treatment of mastitis, and may be used as a vaginal ointment for treatment of various types of infections or as a prophylactic to prevent infections, preparatory to operations, childbirth, etc.

Our ointment may be prepared sterilely so that the ointment is usable on open wounds. For many purposes, sterility is not mandatory so that a sanitary technique can be used in preparation, but absolute sterility is not required. In view of the ease of attaining sterility in the preparation of our ointment, it is economically feasible to prepare our ointment as a sterile product in many instances where previously non-sterile ointments have been the custom.

Our ointment has a high water number, that is, it will cream with or absorb a relatively large amount of water or aqueous fluids without breaking down, and is in general compatible with aqueous fluids at the site of application. Our ointment therefore (1) keeps the wound or treated area comparatively dry, thus preventing maceration, and hindering bacterial growth, (2) releases a broad-spectrum antibiotic slowly at the site, (3) minimizes adherence of dressings to the wound, (4) keeps the site and surrounding area supple, and (5) does not interfere with the healing of the wound. Also, our ointment is storage stable so that it may be prepared and distributed economically.

Our ointment base consists of (1) a dispersing agent such as glyceryl monostearate or a cholesterol ester or glyceryl monolaurate or other glyceryl mono-ester of a long chain fatty acid, (2) mineral oil, (3) petrolatum, either white or yellow, (4) lanolin, preferably anhydrous, and in most instances an acid washed anhydrous lanolin, and (5) a wax such as ceresin wax or beeswax or paraffin wax. We find that from 1 to 10% of the dispersing agent, from 5 to 20% of lanolin, from 10 to 30% of petrolatum, from 5 to 20% of the wax, and from 30 to 60% of mineral oil or liquid petrolatum gives us a preferred ointment base. From 0.1 to 10% of the antibiotic is present therein. We prefer that within the above listed ranges, the proportions be so chosen that the ointment melts close to body temperature. The melting point of the ointment is not a strictly sharp melting point as the ointment melts over a range. A convenient method of measuring the melting point is to melt the ointment and allow it to cool and take the point at which solids first appear as the initial melting point, and the point at which the last liquid disappears as the final melting point. We prefer that the body temperature of 37° C. be included in the melting point range, but if the range includes temperatures between 33° C. to 44° C., the ointment is very satisfactory. For some conditions, the higher or the lower melting point ointments are preferred. Increased proportions of the wax tend to raise the melting point, and higher proportions of the mineral oil tend to lower it. An adjustment of ratio of the wax to mineral oil and to petrolatum permits an adjustment of the melting range as desired, even though the proportions of the other components may vary. The exact melting point may vary for even the same ratio of ingredients, as the components themselves may vary slightly in their melting points, even though meeting the U. S. P. standards.

The broad-spectrum antibiotics of the tetracycline type, of which chlortetracycline and oxytetracycline were the first discovered, or mixtures of them, in a therapeutically useful form may be used. The broad-spectrum tetracycline-type antibiotic such as chlortetracycline, may be present as a salt with an acid, such as the hydrochloride salt or the sulfate, or as the free base or as a salt with a metallic or nitrogen base, or any other stable therapeutically effective form such as the lauryl sulfate or the aluminum glycinate salts, depending upon the stable salts which the particular antibiotic forms. We normally prefer to use the hydrochloride salt, such as chlortetracycline hydrochloride, as it is readily available commercially, it is easily and conveniently micropulverized and utilized.

The degrees of dispersion of the antibiotic in the ointment may vary but we find that a commercially available chlortetracycline hydrochloride micropulverized power in which approximately 35% by weight is within the range of 5 to 10 microns, approximately 60% within the range of 3 to 5 microns, and approximately 5% less than 5 microns, gives excellent results. Larger particle sizes may be used where it is desired to prolong the action of the antibiotic, and smaller particle sizes may be used if conveniently procurable.

The broad-spectrum antibiotic may be suspended in the mineral oil and ground therein. Normally, it is more convenient if the antibiotic is micropulverized in the dry state before mixture with other components of the ointment.

Our ointment may contain additional medicaments, such as the alkyl esters of para-hydroxy benzoic acid. Such esters assist in preventing the growth of monilia and assist in keeping a wound clean.

The order of mixing of the components may be varied. We find it most convenient to mix the dispersing agent, petrolatum, lanolin and the wax with or without part of the mineral oil until smoothly blended, and to mix the remainder of the mineral oil with the antibiotic, and if desired, the alkyl ester of para-hydroxy benzoic acid, and sterilize the two mixtures separately by heating at 110° C. for 10 hours, or other suitable treatment, and then blend them aseptically. It is found that the completed ointment cannot be sterilized by heat without the decomposition or inactivation of at least part of the antibiotic.

It is normally more convenient to blend the dispersing agent, the lanolin, the wax and the petrolatum at a temperature sufficient to liquefy them.

For non-sterile preparations, the mineral oil may then be added, followed by the antibiotic, the antibiotic being added at a temperature low enough so that it is not inactivated. Temperatures under 50° C. are preferred. It is, of course, possible to use the same order of addition under aseptic conditions by sterilizing each of the components separately and then admixing them. For commercial operations, however, it is much more convenient to mix and sterilize the dispersing agent, the lanolin, the wax, and the petrolatum at one time and the dispersion of the antibiotic in at least part of the mineral oil as a separate mixture, and combine the two. A more homogeneous mixture may be obtained if agitation is continued until the ointment has at least partially solidified, particularly if large particles of the antibiotic are suspended in the mixture.

In order that our invention may be more readily understood, certain examples, by way of illustration but not limitation, are herein set forth.

EXAMPLE 1

Chlortetracycline vaginal ointment

A commercial run of 5,000 1-ounce tubes may be prepared by mixing together in a stainless steel kettle and melting 57.75 kilograms of glyceryl monostearate, 115.5 kilograms of anhydrous lanolin, 173.25 kilograms of ceresin wax, and 231 kilograms of white petrolatum, all meeting pharmaceutical grade requirements. The mixture is thoroughly blended. A separate mixture is prepared of 16.5 kilograms of chlortetracycline hydrochloride, crystalline, which has been micropulverized, and about 200 kilograms of mineral oil. The mixture is homogenized in a colloid mill set at 0.002". Inasmuch as sterility is not required, the suspension of chlortetracycline is then added to the mixture in the stainless steel kettle and sufficient mineral oil used to rinse the dispersing tank and colloid mill and added to the kettle so that a total of 906 kilograms are added to the mixture. The completed mixture is stirred, and cooled to a temperature of 30° C., then filled at that temperature into 1-ounce ointment tubes suitable for the administration of the ointment. 1.10% of chlortetracycline hydrochloride is present in the ointment. The ointment may be stored at room temperature under normal storage conditions for pharmaceutical products for a period of at least one year without the potency dropping below 1%. Continuing tests indicate that the ointment is stable for a much longer period of time.

EXAMPLE 2

Mastitis ointment

A mixture may be prepared of 5 kilograms of anhydrous lanolin, 24 kilograms of petrolatum, 6 kilograms of glyceryl monostearate, 5 kilograms of ceresin wax and 30 kilograms of liquid petrolatum U. S. P. The mixture is thoroughly blended and heated at 110° C. for 10 hours. A second mixture is prepared containing 30 kilograms of mineral oil (liquid petrolatum, U. S. P.) and 7 kilograms of chlortetracycline hydrochloride, micropulverized. The mixture may be passed through a colloid mill to homogenize it after which it is sterilized at 110° C. for 10 hours. The two mixtures may be then combined and blended at a temperature of about 40 to 50° C., aseptically, and filled into ¼-ounce tubes having a tip suitable for the injection of the ointment as a mastitis ointment. The mixture has a melting point of around 44 to 55° C., which is higher than is desired for many purposes.

EXAMPLE 3

Wound ointment

A mixture may be prepared of 15.1 grams of beeswax, 14.4 grams of lanolin, 22.6 grams of petrolatum and 1 gram of glyceryl monostearate. The mixture may then be blended and sterilized, after which there is added thereto a sterile mixture of 45.9 grams of mineral oil and 1 gram of chlortetracycline hydrochloride. The mixtures are aseptically combined and filled into tubes. The final product has a melting point of 36 to 43° C. and is an excellent ointment for direct application to open wounds.

EXAMPLE 4

Ophthalmic ointment

An ointment may be similarly prepared containing 20 parts of lanolin, 29 parts of petrolatum, 1 part of glyceryl monostearate, 5 parts of ceresin wax, 44.9 parts of mineral oil and 0.1 part of chlortetracycline hydrochloride, the method of compounding being that in the last example. The final product contains 0.1% of the broad-spectrum antibiotic and is very useful as an ophthalmic ointment. The melting range is from 33 to 43° C.

EXAMPLE 5

Cholesterol ointment

An ointment may be prepared as set forth in Example 3, containing 5 parts of lanolin, 25 parts of petrolatum, 60 parts of liquid petrolatum, 5 parts of ceresin wax and 5 parts of the cholesterol ester sold as "Amerchol CAB" by the American Cholesterol Company. 0.1% of oxytetracycline hydrochloride is added. The mixture forms a sterile ophthalmic ointment with a melting range between 34 and 43° C.

EXAMPLE 6

Wound ointment

A mixture may be prepared containing 5 grams of glyceryl monostearate, 10 grams of anhydrous lanolin U. S. P., 20 grams of white petrolatum U. S. P., and 15 grams of refined ceresin wax, which is mixed in an ointment mill until a smooth homogeneous mixture is obtained. The mixture may then be heated at 110° C. for 10 hours. Separately, a mixture of 49 grams of mineral oil U. S. P. and 1 gram of chlortetracycline hydrochloride, crystalline, may be prepared and ground until the chlortetracycline is micropulverized. The mixture is then sterilized at 110° C. for 10 hours after which it may be aseptically combined with the first prepared mixture, and filled aseptically into jars to be stored until used. The ointment is stable under normal storage conditions without appreciable loss of potency for periods of at least a year.

Certain uses for ointments which are prepared in accordance with this invention are described and claimed in our co-pending application, Serial No. 222,730 filed April 24, 1951.

Where percentages are specified in the appended claims, such percentages are based upon the final ointment composition, and are by weight.

As our invention, we claim:

1. An anhydrous, storage stable, therapeutic ointment having a melting range including at least part of the range 33 to 44° C. and comprising from 1 to 10% of a dispersing agent from the group consisting of the monoglyceryl esters of long chain fatty acids and the esters of cholesterol, from 5 to 20% of anhydrous lanolin, from 10 to 30% of petrolatum, from 5 to 20% of a wax from the group consisting of ceresin wax, paraffin wax and beeswax, from 30 to 60% of liquid petrolatum and from 0.1 to 10% of a broad-spectrum tetracycline type antibiotic.

2. An anhydrous, storage-stable sterile ointment comprising 5 parts of glyceryl monostearate, 10 parts of anhydrous lanolin, 20 parts of white petrolatum, 15 parts of ceresin wax, 49 parts of mineral oil and 1 part of micropulverized chlortetracycline hydrochloride.

3. An anhydrous, storage-stable sterile ointment comprising approximately 3.85 parts of glyceryl monostearate, 7.70 parts anhydrous lanolin, 15.40 parts of white petrolatum, 11.55 parts of ceresin wax, 60.40 parts of liquid petrolatum and 1.10 parts of micropulverized chlortetracycline hydrochloride.

4. The ointment of claim 1 in which the broad-spectrum tetracycline type antibiotic is selected from the group consisting of chlortetracycline, oxytetracycline, and their therapeutically effective salts.

References Cited in the file of this patent

UNITED STATES PATENTS

| | | |
|---|---|---|
| 2,173,203 | Harris | Sept. 19, 1939 |
| 2,680,701 | Cusumano | June 8, 1954 |

OTHER REFERENCES

Atlas, 1946, Drug and Cosm. Emulsions, pp. 36–39, Medicated Ointment Formulations.

Drug and Cosmetic Ind., April 1950, Advancing Therapy, p. 456, part. "Aureomycin Ointment."

Drug and Cosmetic Ind., July 1950, "Aureomycin (Ointment) for Skin Infections," p. 111.

Fiero et al.: Glycol Esters in Ointment Bases, J. Am. Pharm. Assn., Sci. Ed., February 1945, pp. 56–59.

J. A. P. A., Prac. Phar. Ed., April 1946, "Study of Surface-Active Agents as Bases; Non-Aqueous, Water-Miscible Ointment Bases," pp. 158–160

Boyes: Report of a Symposium on New Emulgents and Ointment Bases, Quarterly J. of Pharm. and Pharmacology, Brit. Pharm. Conference, Torquay, 1947, October–December 1947, pp. 481–501.

Bond et al.: The Stability of Bactracin, J. A. P. A., Sci. Ed., January 1949, pp. 30–34.

Perrin et al.: A Comparative Study of the Use of Hydrophilic Absorption Ointment Bases, Jour. Inv. Derm., vol. 16, No. 1, January 1951, pp. 7–9.

Am. J. Pharm., vol. 122, No. 10, October 1950, pp. 368–380, at page 379; (crystalline terramycin hydrochloride is available suspended in a petrolatum base).